(12) United States Patent
Klossner (10) Patent No.: US 9,861,079 B2
(45) Date of Patent: Jan. 9, 2018

(54) APPARATUS AND METHOD FOR THE DEFENSE OF AN ANIMAL

(71) Applicant: Kathy Klossner, Cardiff by the Sea, CA (US)

(72) Inventor: Kathy Klossner, Cardiff by the Sea, CA (US)

( * ) Notice: Subject to any disclaimer, the term of this patent is extended or adjusted under 35 U.S.C. 154(b) by 44 days.

(21) Appl. No.: 14/636,096

(22) Filed: Mar. 2, 2015

(65) Prior Publication Data

US 2015/0250143 A1 Sep. 10, 2015

Related U.S. Application Data

(60) Provisional application No. 61/950,000, filed on Mar. 7, 2014.

(51) Int. Cl.
*A01K 27/00* (2006.01)
*A01K 15/02* (2006.01)

(52) U.S. Cl.
CPC .......... *A01K 27/009* (2013.01); *A01K 15/021* (2013.01)

(58) Field of Classification Search
CPC ............................ A01K 15/021; A01K 27/009
USPC .......... 119/654, 719, 720, 850, 856, 858–860
See application file for complete search history.

(56) References Cited

U.S. PATENT DOCUMENTS

| | | | |
|---|---|---|---|
| 254,156 A | 2/1882 | Bicker | |
| 1,349,665 A * | 8/1920 | Duncombe | A01K 13/006 119/855 |
| 2,808,030 A | 10/1957 | Costanzo | |
| 4,627,385 A | 12/1986 | Vinci | |
| 4,876,674 A * | 10/1989 | Parmely | A01K 27/009 116/22 A |
| 4,900,876 A | 2/1990 | Bushman et al. | |
| 5,009,192 A * | 4/1991 | Burman | A01K 15/023 119/719 |
| 5,046,453 A * | 9/1991 | Vinci | A01K 15/022 119/654 |
| 5,868,103 A * | 2/1999 | Boyd | A01K 15/021 119/719 |
| 5,952,925 A * | 9/1999 | Secker | A01K 15/02 119/859 |
| 6,047,664 A * | 4/2000 | Lyerly | A01K 15/021 119/719 |
| 6,178,923 B1 * | 1/2001 | Plotkin | A01K 27/006 119/719 |
| 6,327,998 B1 | 12/2001 | Andre et al. | |

(Continued)

FOREIGN PATENT DOCUMENTS

JP 2005518206 A 6/2005

OTHER PUBLICATIONS

"Turkish Collars," version published Feb. 18, 2013 available at www.archive.org/web/20130218130813/http://www.cobankopegi.com/collar.html.*

(Continued)

*Primary Examiner* — Lisa L Tsang
(74) *Attorney, Agent, or Firm* — Durham Jones & Pinegar; Randall B. Bateman; Sarah W. Matthews (57) ABSTRACT

A defense apparatus for a dog or other animal, comprising a transmitting unit to be held by a person responsible for the animal, such as its owner, and a receiving unit configured to be worn by the animal, such as a collar. The owner may use the transmitting unit to activate a spray mechanism and/or sound frequency to be emitted from the receiving unit worn by the animal.

16 Claims, 4 Drawing Sheets

(56) References Cited

U.S. PATENT DOCUMENTS

| | | | | |
|---|---|---|---|---|
| 6,415,742 | B1* | 7/2002 | Lee | A01K 15/023 |
| | | | | 119/719 |
| 6,668,760 | B2 | 12/2003 | Groh et al. | |
| 6,820,571 | B2* | 11/2004 | Cory | A01K 15/02 |
| | | | | 119/665 |
| 7,992,525 | B1* | 8/2011 | Fisher | A01K 15/02 |
| | | | | 119/860 |
| 8,091,512 | B2 | 1/2012 | So | |
| 2007/0209604 | A1* | 9/2007 | Groh | A01K 15/021 |
| | | | | 119/858 |
| 2008/0072842 | A1* | 3/2008 | King | A01K 15/02 |
| | | | | 119/719 |
| 2010/0263603 | A1* | 10/2010 | Baron | A01K 13/006 |
| | | | | 119/850 |
| 2010/0286803 | A1* | 11/2010 | Tillotson | A01M 1/026 |
| | | | | 700/94 |
| 2011/0030622 | A1* | 2/2011 | So | A01K 15/021 |
| | | | | 119/719 |
| 2012/0186536 | A1* | 7/2012 | Hall | A01K 15/02 |
| | | | | 119/719 |

OTHER PUBLICATIONS

"Sheep Collar Texts Shephers When Wolves Attack," https://www.wired.com/2012/08/sheep-texting-wolf-attacks/ (Aug. 6, 2012).*

* cited by examiner

APPARATUS AND METHOD FOR THE DEFENSE OF AN ANIMAL

BACKGROUND OF THE INVENTION

Field of the Invention

The present invention relates generally to defense apparatuses for domesticated animals. More particularly, the present invention relates to an improved device for a domesticated animal to wear to prevent prolonged animal fights.

Background

It is common for dogs to become aggressive with one another and engage in fights. Commonly, during a fight a dog will attempt to grab hold of its opponent's neck with its teeth in order to kill the other dog or force the other dog into submission. Dog fights pose dangers to both the animals involved and, unfortunately, to dog owners as they can be bitten in the attempt to stop the dogs from fighting. Dog fights can also cost hundreds or thousands of dollars in veterinarian bills for the dogs and medical bills for injured owners.

Several methods are commonly attempted to get dogs to stop fighting. If one has access to a hose, spraying the dogs with water will often cause the dogs to stop fighting with one another. Likewise there are various chemicals which can be sprayed on the dogs which are irritating to the dogs and thereby cause the dogs to stop fighting. However, people often do not have access to a hose while walking their dogs or otherwise out in public with their dogs. Additionally, dog owners usually do not want to spray their dog with an irritant in case they encounter an aggressive dog, and getting close enough to spray the irritants on fighting dogs can put the dog owners at risk.

Thus, there is a need for an apparatus and method to assist pet owners in defending their animals from other aggressive animals. It may be advantageous for the apparatus or system to be simple to deploy and be available for use at all times when other animals are present.

SUMMARY

Thus, the present disclosure provides an apparatus and method for the defense of an animal. According to one configuration, a transmitting unit to be held by a person responsible for the animal, such as the animal owner, is provided. A receiving unit to be held by the animal is also provided, the transmitting unit being capable of communicating with the receiving unit.

According to one configuration, the transmitting unit may be comprised of at least one activator, such as a button, knob, etc. In one configuration, the transmitting unit may include a spray activator and a sound activator. A protective cover may also be provided to prevent accidental activation of the activator(s).

According to another aspect, the transmitting unit may be easy to carry, and in one configuration, the transmitting unit may be integral to an animal leash.

According to another aspect, the transmitting unit may be in communication with the receiving unit, such as by radio frequency, etc., such that an activation of the spray activator and/or sound activator may cause the transmitting unit to send a signal to the receiving unit.

According to yet another configuration, the receiving unit may comprise a collar to be worn by an animal. In one configuration, the collar may include a housing, the housing comprising a receiver, a speaker, and a spray mechanism. The housing may also include a liquid container for a substance that is annoying to animals.

According to another configuration, the spray mechanism comprises an electronically activated valve connected to the liquid container and a length of tubing. The length of tubing may extend around the animal collar, and include a plurality of nozzles. The plurality of nozzles may spray the annoying substance radially outwardly when a pet owner activates a spray activator on the transmitting unit.

According to another aspect, the collar includes a speaker for emitting a high-pitched frequency when the pet owner presses or otherwise activates the sound activator on the transmitting unit. The high-pitched frequency may be annoying and/or alarming to dogs.

According to another aspect, a method is provided for the defense of an animal. The method may comprise providing a transmitting unit for the person responsible for the animal, and providing a receiving unit to be worn by the animal. The receiving unit may comprise a frequency emitter and/or a spray mechanism that can be activated remotely by the transmitting unit.

These and other aspects of the present disclosure are realized in an apparatus and method for the defense of an animal as shown and described in the following figures and related description.

BRIEF DESCRIPTION OF THE DRAWINGS

Various embodiments of the present disclosure are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The following description includes various representative embodiments and specific details in order to provide a thorough understanding of the present disclosure. The skilled artisan will understand, however, that the methods and devices described below can be practiced without employing these specific details, or that they can be used for purposes other than those described herein. Indeed, they can be modified and can be used in conjunction with products and techniques known to those of skill in the art in light of the present disclosure.

Reference in the specification to "one configuration," "one embodiment" "one aspect" or "a configuration," "an embodiment" or "an aspect" means that a particular feature, structure, or characteristic described in connection with the configuration may be included in at least one configuration and not that any particular configuration is required to have a particular feature, structure or characteristic described. The appearances of the phrase "in one configuration" or similar phrases in various places in the specification are not necessarily all referring to the same configuration, and may not necessarily limit the inclusion of a particular element of the invention to a single configuration, rather the element may be included in other or all configurations discussed herein. Thus it will be appreciated that the claims are not intended to be limited by the representative configurations shown herein. Rather, the various representative configurations are simply provided to help one of ordinary skill in the art to practice the inventive concepts claimed herein.

The invention and accompanying drawings will now be discussed in reference to the numerals provided therein so as to enable one skilled in the art to practice the present invention. The drawings and descriptions are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

Prior to discussing particular configurations, it should be understood that the present invention is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or configurations shown unless expressly indicated as such. Likewise, the discussion of any particular aspect of the invention is not to be understood as a requirement that such aspect is required to be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a spring" may include one or more of such springs, and reference to "the layer" may include reference to one or more of such layers.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing the nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

As used herein, the term "dog" refers to any type of domesticated animal. Although the specification herein refers frequently to dogs as exemplary domesticated animals, it is understood that the various apparatus, device and method configurations described herein may be used for preventing and stopping animal fights other than dog fights and that the scope of the claims referring to a "dog" or "dogs" encompasses all such types of domesticated animals that are capable of fighting with one another and shall not be limited by any particular references in the specification to "dogs."

Figure 1:
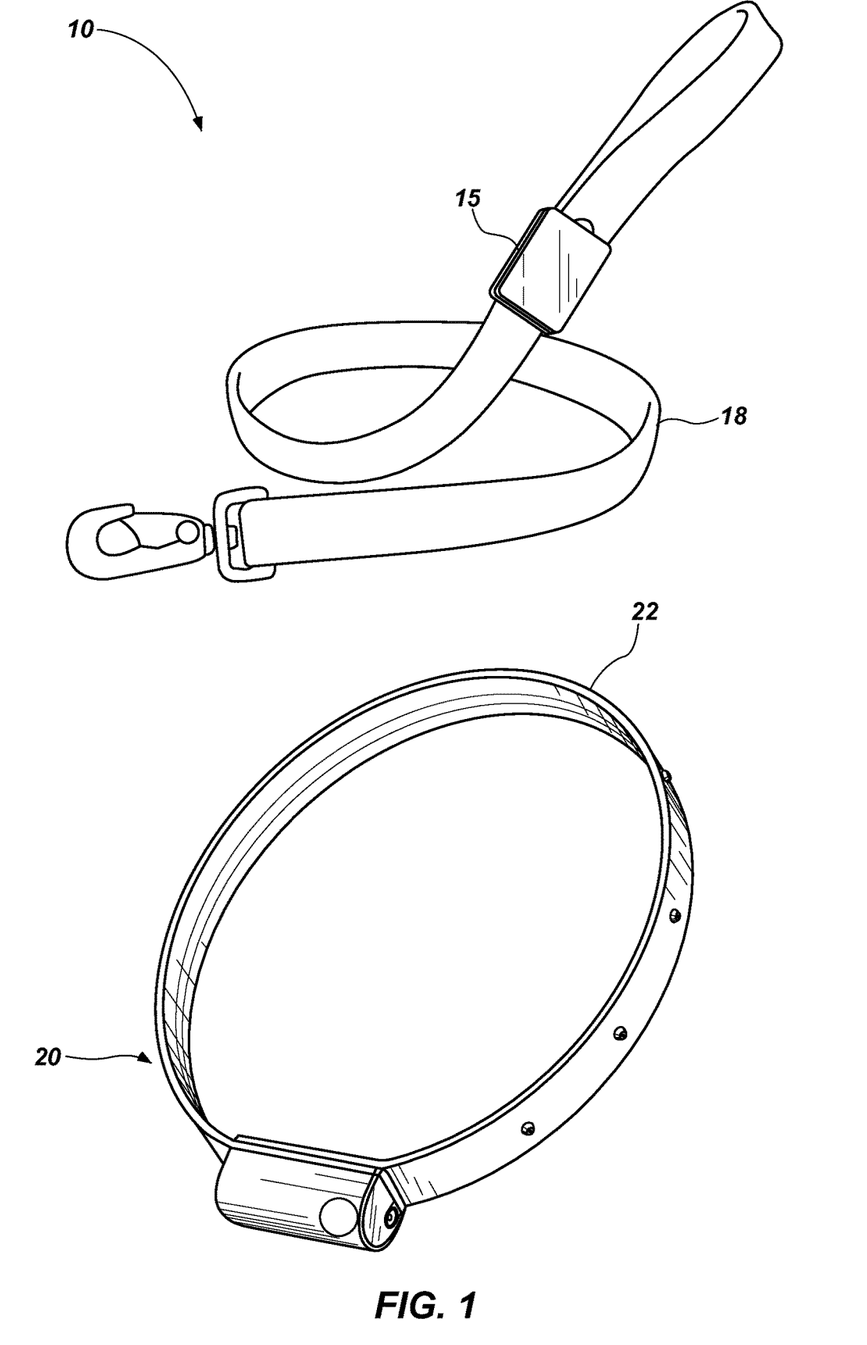
FIG. 1 illustrates a perspective view of parts of an animal defense apparatus according to one configuration.

Turning now to FIG. 1, there is shown an apparatus, generally indicated at 10, according to one configuration of the present disclosure. According to this configuration, the apparatus is generally comprised of a transmitting unit 15 and a receiving unit 20. In this configuration, the transmitting unit 15 is integral to an animal leash 18. This configuration may be preferred because it may eliminate the problem of the transmitting unit 15 being forgotten at home. Pet owners normally bring their animals out on a leash, and thus they would not have to remember to bring a separate transmitter. (It will also be appreciated that the transmitting unit may be stored in, but removable from, the leash). The receiving unit, according to one configuration, may be integral to an animal collar 22.

The Transmitting Unit

In one configuration, the transmitting unit 15 may be convenient to carry such that a pet owner would normally carry it around without having to remember to bring the transmitting unit 15. For example, the transmitting unit 15 may be integral to something the pet owner would carry anyway. For example, the transmitting unit 15 may be provided on a key ring such that a pet owner could carry the transmitting unit on their normal key ring they typically carry already. In another configuration, the transmitting unit may be integral to an animal's leash. In yet another configuration, a smart phone or similar device application may be provided to act as the transmitting unit 15 and be used to send a signal to the receiving unit 20. Various other types of transmitting units may be used, and the transmitting unit may be configured to be integral to another device or product or carried separately.

Figure 2A:
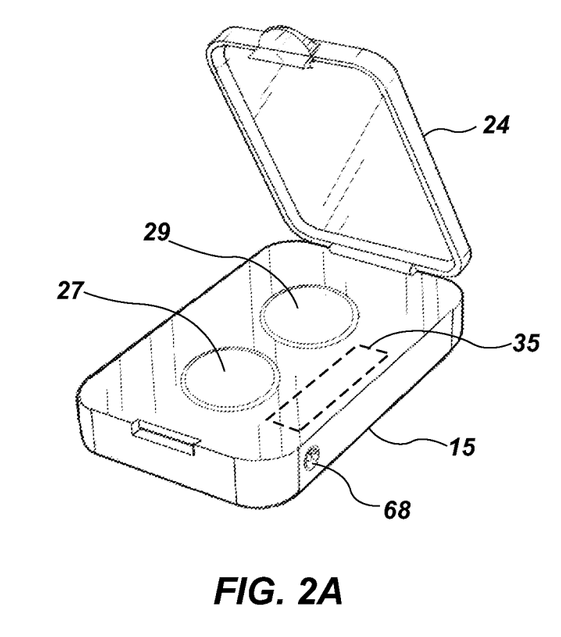
FIG. 2A illustrates a perspective view of a transmitting unit according to one configuration.
Figure 2B:
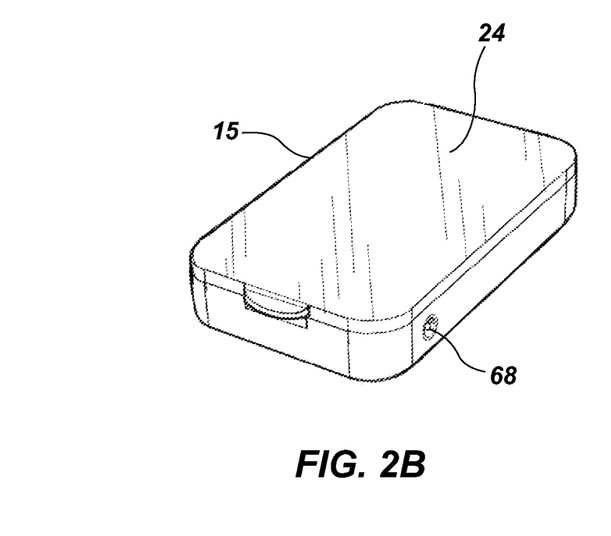
FIG. 2B shows the transmitting unit of FIG. 2A with a protective cover in a closed position.

In one configuration, the transmitting unit includes two activators, as shown in FIG. 2A. "Activator" means a mechanism to activate a signal to be sent from the transmitting unit to the receiving unit. For example, an activator may be a button, a key, a switch, a knob, etc. In some configurations, the transmitting unit may include a single activator, such as a button. In other configurations, the transmitting unit includes two activators. The transmitting unit 15 may also include a protective cover 24 over the activator(s) to prevent an accidental or inadvertent activation. FIG. 2B shows the transmitting unit 15 with the protective cover 24 closed.

In a currently preferred configuration, the transmitting unit 15 includes a spray activator 27 and a sound activator 29. This may allow a pet owner, for example, to press the sound activator 29 to cause the receiving unit 20 on their pet to emit a sound that is annoying, disturbing, and/or alarming to animals. Then, if that does not turn away an attacking animal, the pet owner may press the spray activator 27 to cause the receiving unit 20 on their pet to spray a chemical or substance that is annoying or disturbing. This configuration may allow the pet owner to have additional control over the defense of their pet depending on the circumstances and the level of aggression shown by another animal. For example, a pet owner may activate the sound activator 29 as a means to deter a threatening animal to preemptively prevent a fight or attack.

The transmitting unit 15 also comprises a transmitter 35, the transmitter 35 (shown in dashed lines in FIG. 2A) being in connection with at least one activator, such as the spray activator 27 and/or the sound activator 29. The transmitter 35 transmits a signal corresponding to the activation signal received from the activator. For example, in one configuration, the pet owner may press the spray activator 27, which may be in connection with the transmitter 35. The transmitter 35 would then transmit the signal corresponding to spray activation to the receiving unit 20. Similarly, the pet owner may press the sound activator 29, which may also be in connection with the transmitter 35, and the transmitter would then transmit the signal corresponding to sound activation to the receiving unit 20.

The transmitter 35 and receiver 48 may be of any suitable type of wireless transmitter/receiver known in the art, for example, radio frequency, infrared, Bluetooth, etc. In one configuration, a transmitter may send a unique identification code that is also programmed into the receiver. This may be similar to those systems typically used for remote keyless entry, and may ensure that a pet owner's transmitting unit only sends a signal to their pet's receiving unit. This may prevent false signals from one pet owner's transmitting unit to someone else's pet's receiving unit.

Receiving Unit

The receiving unit 20 is configured to be carried by an animal. In one configuration, the receiving unit may be integral to a collar (22 in FIG. 1) to be worn by an animal. The receiving unit 20 may include a receiver 48 (FIG. 4) for receiving the signal(s) from the transmitter, a liquid reservoir 42 (FIG. 4) to hold a substance that is annoying to animals, and a spray mechanism 45 (FIG. 4) in communication with the liquid reservoir and the receiver. In one configuration shown in FIG. 3, the receiving unit 20 may have a housing 39 which houses the receiver 48 and/or the liquid reservoir 42. The receiver 48 may be any wireless receiver known in the art that may pair with the transmitter. Any suitable wireless method of communication between the receiver and the transmitter is contemplated herein, such as radio frequency, infrared, Bluetooth, WiFi, Zigbee, WiMAX, etc.

Figure 4:
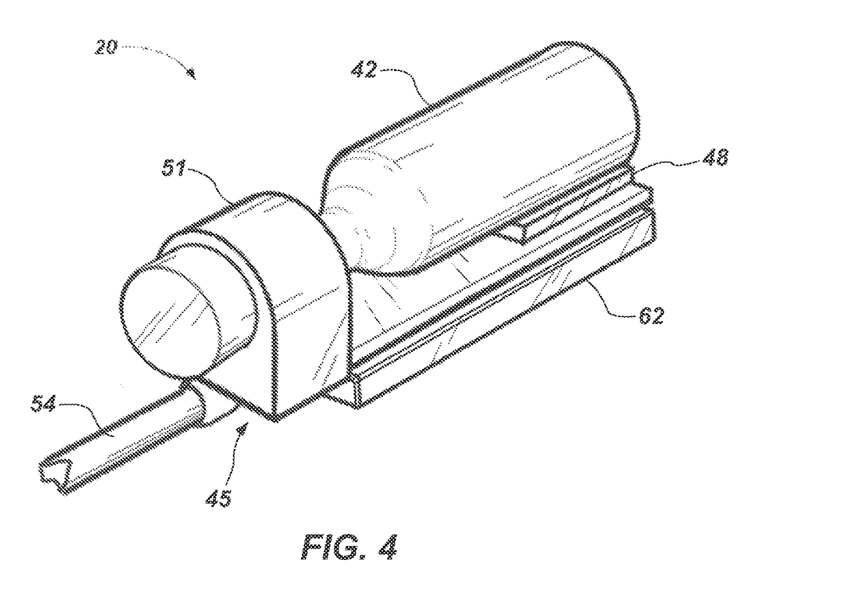
FIG. 4 shows a perspective view of the internals of the housing of the receiving unit of FIG. 3.

FIG. 4 shows an perspective view of the internals of the housing 39 on the receiving unit 20. The liquid reservoir 42 may be any suitable container to house a liquid, and in one configuration the liquid reservoir 42 may be a compressed fluid canister. The substance that is held in the liquid reservoir may be any substance that is annoying or disturbing to animals and that would encourage an attacking animal to back down. For example, citronella may be used. Alternatively, water or any other suitable liquid may be used.

The spray mechanism 45 is in communication with the liquid reservoir 42 and the receiver 48. When the receiver 48 receives a signal from the transmitter 35 of the transmitting unit 15 to activate the spray mechanism 45, the spray mechanism 45 sprays a predetermined amount of the substance that is annoying to animals. This predetermined amount may configured or designed to be any desired amount. In one configuration, the pet owner may activate the spray activator 27 of the transmitting unit 15 once, and the spray mechanism 45 in the receiving unit 20 will spray an amount of the annoying substance. The pet owner may activate the spray activator 27 again to spray an additional amount of the annoying substance again, and repeat until the attacking animal backs down.

In one configuration, the housing 39 may have an opening or door such that the user can open the housing to replace the battery, and/or replace or refill the liquid reservoir 42. In one configuration, the pet owner may activate the spray activator 27 of the transmitting unit 15 once, and the spray mechanism 45 in the receiving unit 20 will spray the entire contents of the liquid reservoir 42. If the contents are pressurized, the attacking animal may be additionally deterred by not just the annoying substance, but also by the force of the liquid being sprayed. In this configuration, a pet owner may replace the liquid reservoir 42 and/or refill the liquid reservoir 42, and any accompanying pressurization devices, such as a $CO_2$ cartridge, after it is used.

Figure 5A:
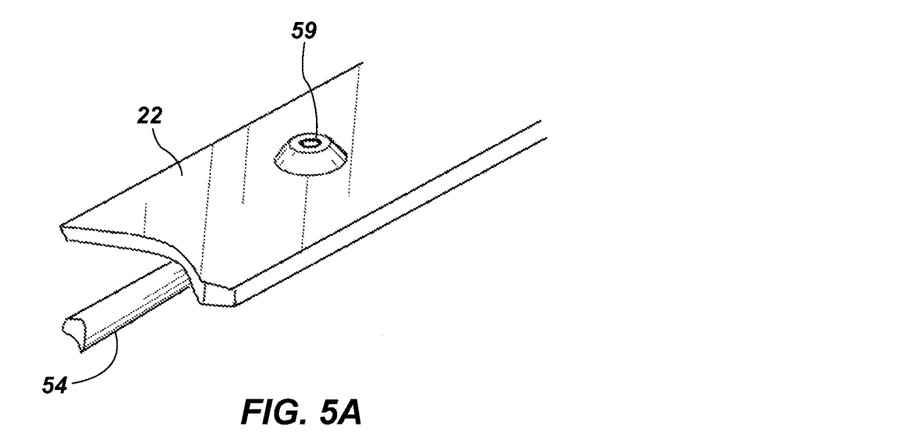
FIGS. 5A-5C show partial perspective views of various configurations of collars made in accordance with principles of the present disclosure.
Figure 5B:
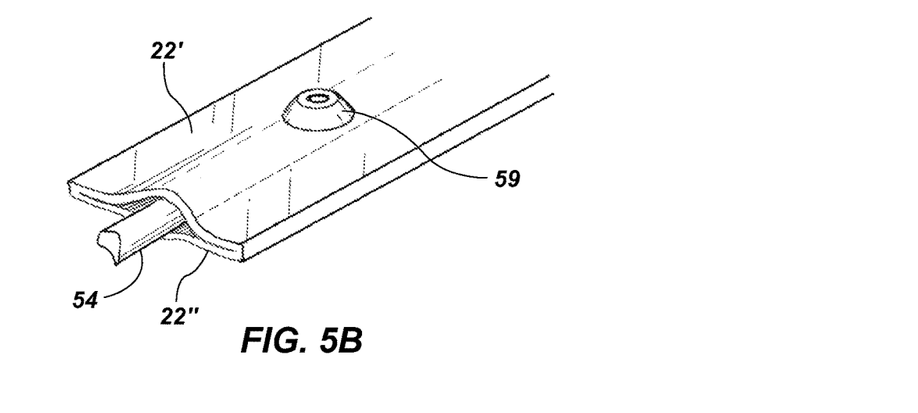
Figure 5C:
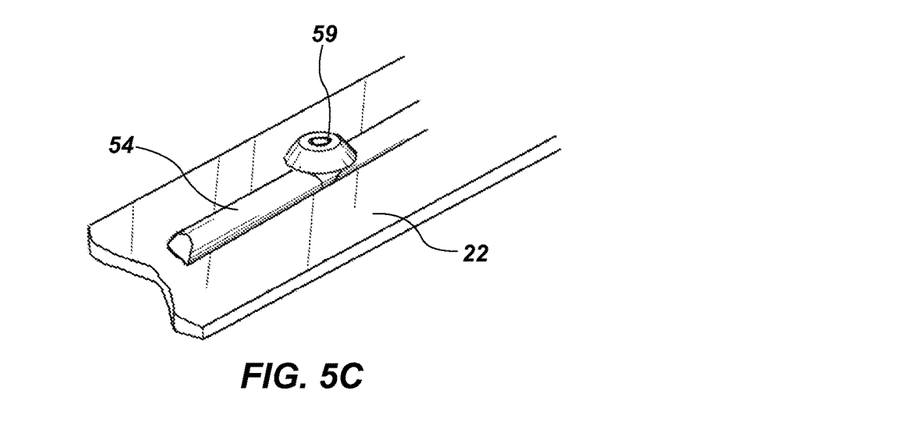

In one configuration, the liquid reservoir 42 is comprised of a compressed fluid canister, and the spray mechanism 45 includes an electronically activated valve 51 connected to the compressed fluid canister and a length of tubing 54 having a plurality of nozzles 59 (FIGS. 5A-5C). The electronically activated valve 51 may be in communication with the receiver 48, such that a spray activator signal received by the receiver 48 may open the electronically activated valve 51. The annoying substance may then be forced through the length of tubing 54 and out the plurality of nozzles 59. The sheer force of the annoying substance as it ejects from the nozzles may also surprise, thwart, or otherwise cause the attacking animal to back down.

Figure 3:
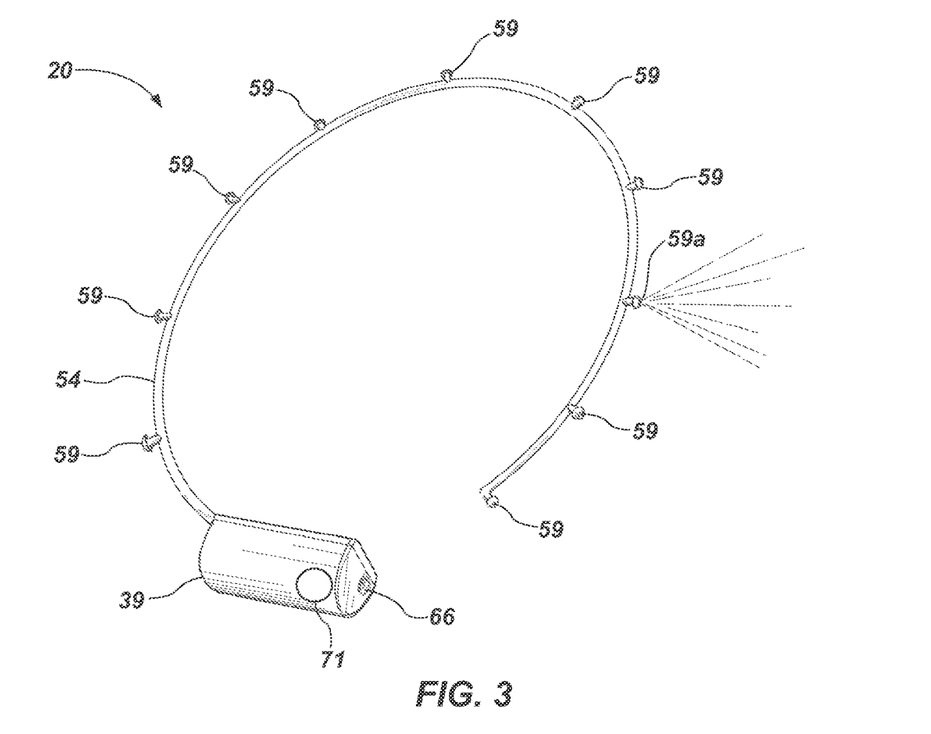
FIG. 3 shows a perspective view of a receiving unit according to one configuration.

In one configuration, the plurality of nozzles 59 are pointed outwardly from the animal carrying the receiving unit. In this manner, the annoying substance may be sprayed radially outwardly at an attacking animal. In such a situation the irritant is likely to be sprayed directly into the face of a dog which is attempting to grab hold of the neck of another dog. In FIG. 3, a single nozzle 59a is shown ejecting the irritating fluid radially outwardly for clarity. Ordinarily all of the nozzles would spray irritant when the receiver 48 is activated. Thus the irritant can quickly stop animal aggression, reduce veterinarian bills due to injury, and otherwise minimize harm to the dogs and their owners.

The receiving unit may also include a battery 62. In some configurations, the battery may be a re-chargeable battery, and a connection 66 may be provided to plug in the housing 39 to re-charge the battery 62. A similar plug-in 68 may be provided on the transmitting unit 15 to re-charge the battery of the transmitting unit 15.

According to another aspect, the receiving unit 20 may also comprise a speaker 71 (FIG. 3), which may be in communication with the receiver 48. The speaker 71 may be configured to emit a noise or frequency when the receiver 48 receives the signal from the transmitter 35. For example, the speaker 71 may be used to emit a noise that disturbs, annoys, and/or alarms animals, such as a high-pitched frequency. Any suitable frequency may be used, and in some configurations the frequency may comprise a frequency of about 20,000 Hz to 45,000 Hz.

FIGS. 5A-5C show fragmented, close-up views of exemplary configurations of the animal collar 22 as it may be constructed with the tubing 54 and plurality of nozzles 59 of the receiving unit 20. For example, in FIG. 5A, the tubing 54 may be connected to the underside of an animal collar 22, with holes provided in the collar for the plurality of nozzles 59 to engage. In FIG. 5B, the tubing 54 may be disposed between a top 22' and bottom layer 22" of an animal collar 22, with the top layer 22' of the animal collar 22 having holes there through to engage the plurality of nozzles 59. In FIG. 5C, the tubing 54 and the plurality of nozzles 59 may be disposed generally on top of the animal collar 22. These configurations are all exemplary configurations, and many other varying configurations are contemplated and may be used in accordance with the principles disclosed herein. In some configurations, the receiving unit 20 may be integral to a collar, and in other configurations, the receiving unit 20 may be configured to be attached to an existing collar.

In use, an animal owner would attach the receiving unit 20 to their animal, either by attaching it to an existing collar or by use of a collar having the receiving unit attached to or formed therein. It may be preferred to always have the animal wear the receiving unit, rather than taking the receiving unit on and off. If the animal is always wearing the receiving unit it may offer the animal more protection, since animal attacks can be unpredictable. Likewise, an animal owner may wish to keep the transmitting unit with them frequently, and especially when out walking their animal.

With the transmitting unit 15 in their possession and the receiving unit 20 on their animal, an owner may be able to offer defensive protection for their animal. For example, when another animal is being too aggressive, an owner may choose to activate a sound activator on the transmitting unit. This will cause a sound that is annoying to animals, such as dogs, to be played at the receiving unit. This annoying sound could cause the aggressive animal to back away. If an animal attacks suddenly, an owner can immediately activate a spray activator on the transmitting unit to cause an annoying substance, such as citronella, to be sprayed outwardly from the receiving unit onto the attacking animal.

Depending on the situation and the escalation of aggression, an animal owner may use the sound activator and/or spray activator one or more times to defend their animal. This type of defense does not require the animal owner to come into close physical contact with the animals, and thus protects animal owners from harm. It also potentially prevents animal fights and shortens the duration of a fight that does occur.

An animal defense apparatus is described, including a transmitting unit remote from an animal and a receiving unit to be carried by the animal, wherein the transmitting unit comprises: at least one activator to generate an activation signal, and a transmitter in connection with the at least one activator for transmitting a signal corresponding to the activation signal received; and the receiving unit to be carried by an animal comprises: a receiver for receiving the signal from the transmitter, a liquid reservoir holding a substance that is annoying to animals, and a spray mechanism in communication with the liquid reservoir 42 and receiver, the spray mechanism spraying a predetermined amount of the substance when the receiver receives the signal from the transmitter.

The liquid reservoir 42 may comprise a compressed fluid canister, and the spray mechanism may comprise an electronically activated valve, and a length of tubing having a plurality of nozzles. The plurality of nozzles 59 may be directed to project the substance radially outwardly.

The receiving unit 20 of the animal defense mechanism may include a speaker 71 in communication with the receiver, the speaker emitting a noise when the receiver receives the signal from the transmitter. The transmitting unit 15 may be integral to an animal leash, and the receiving unit may be integral to an animal collar. The transmitting unit may further include a protective cover disposed over the at least one activator. The activator may comprise a spray activator and/or a sound activator.

An animal defense apparatus including a transmitting unit remote from an animal and a receiving unit to be carried by the animal is described, wherein the transmitting unit includes: a spray activator to generate a spray activation signal, a sound activator to generate a sound activation signal, a transmitter in connection with the spray activator and sound activator for transmitting at least one of a spray activation signal and a sound activation signal; and the receiving unit to be carried by an animal includes: a receiver for receiving the least one of a spray activation signal and a sound activation signal from the transmitter, a liquid reservoir holding a substance that is annoying to animals, a spray mechanism in communication with the liquid reservoir and receiver, the spray mechanism spraying a predetermined amount of the substance when the receiver receives the spray activation signal from the transmitter, and a speaker in communication with the receiver, the speaker emitting a frequency when the receiver receives the sound activation signal from the transmitter.

The substance that is annoying to animals may comprise, for example, citronella or other known animal irritants. The frequency may comprise a frequency of about 20,000 Hz to 45,000 Hz.

The receiving unit may comprise an animal collar, and the transmitting unit may comprise an animal leash. The transmitter may be, for example, a radio frequency transmitter and the receiver may be a radio frequency receiver.

A method for providing for the defense of an animal is described, the method including: disposing a receiving unit on an animal to be defended, the receiving unit comprising a receiver for receiving the least one of a spray activation signal and a sound activation signal from the transmitter, a liquid reservoir holding a substance that is annoying to animals, a spray mechanism in communication with the liquid reservoir and receiver, the spray mechanism spraying a predetermined amount of the substance when the receiver receives the spray activation signal from the transmitter, and a speaker in communication with the receiver, the speaker emitting a frequency when the receiver receives the sound activation signal from the transmitter; and providing a transmitting unit for a person responsible for the animal, the transmitting unit comprising: a spray activator to generate a spray activation signal, a sound activator to generate a sound activation signal, and a transmitter in connection with the spray activator and sound activator for transmitting at least one of a spray activation signal and a sound activation signal.

The method may also include selectively activating the transmitter to cause the receiver to emit at least one of a sound annoying to animals or a scent annoying to animals. For example, the sound annoying to animals may be a sound at a frequency annoying to dogs and wherein the scent annoying to animals may be a scent annoying to dogs.

Furthermore it will be appreciated that other inventions are hereby disclosed. While the present application shows several different representative configurations, the invention may be embodied in other forms without departure from the spirit and essential characteristics thereof. The embodiments described therefore are to be considered in all respects as illustrative and not restrictive. Although the present invention has been described in terms of certain presently preferred embodiments, other embodiments that are apparent to those of ordinary skill in the art are also within the scope of the invention. For example, components of animal defense apparatus and system can be varied in size, materials, shape, form, function, manner of operation and assembly in accordance with the intended use. Accordingly, it is not intended that the invention be limited, except as by the appended claims.

What is claimed is:

1. A collar and transmitting unit for defending a first dog from a second dog, the collar and transmitting unit consisting essentially of:
   the transmitting unit comprising:
      a spray activator to generate a spray activation signal, the spray activator configured to generate a spray activation signal only in response to an input from a person responsible for the first dog,
      a sound activator to generate a sound activation signal only in response to an input from the person responsible for the first dog, and
      a transmitter in connection with the spray activator and the sound activator for transmitting at least one of the spray activation signal and the sound activation signal; wherein the transmitting unit is remote from the first dog; and
   the collar being attached to the first dog and having a receiving unit comprising:
      a receiver for receiving the least one of the spray activation signal and the sound activation signal from the transmitter,
      a liquid reservoir holding a liquid, the liquid reservoir comprising a compressed fluid canister,
      a spray mechanism in communication with the liquid reservoir and the receiver, the spray mechanism comprising an electronically activated valve and a tube with a plurality of holes, the spray mechanism spraying a predetermined amount of the liquid from the plurality of holes only in a direction perpendicular to the collar and towards the second dog only when the receiver receives the spray activation signal from the transmitter, and
      a speaker in communication with the receiver, the speaker emitting a frequency only when the receiver receives the sound activation signal from the transmitter.

2. The collar and transmitting unit according to claim 1, wherein the liquid is attached to one of citronella and water.

3. The collar and transmitting unit according to claim 1, where the frequency comprises a frequency of about 20,000 Hz to 45,000 Hz.

4. The collar and transmitting unit according to claim 1, wherein the transmitting unit comprises an animal leash.

5. The collar and transmitting unit according to claim 1, wherein the transmitter is a radio frequency transmitter, and the receiver is a radio frequency receiver.

6. A method for a person responsible for a first dog to provide for the defense of the first dog from a second dog, the method consisting essentially of:
   disposing a receiving unit on the first dog, the receiving unit comprising:
      a receiver for receiving at least one of a spray activation signal and a sound activation signal from a transmitting unit,
      a liquid reservoir holding a substance,
      a spray mechanism in communication with the liquid reservoir and the receiver, the spray mechanism spraying a predetermined amount of the substance only radially outwardly in a plurality of directions when the receiver receives the spray activation signal from a transmitting unit, and
      a speaker in communication with the receiver, the speaker emitting a frequency when the receiver receives the sound activation signal from the transmitting unit; and
   providing the transmitting unit for a person responsible for the first dog, the transmitting unit comprising:
      a spray activator to generate the spray activation signal,
      a sound activator to generate the sound activation signal, and
      the transmitting unit in connection with the spray activator and the sound activator for transmitting at least one of the spray activation signal and the sound activation signal;
   the person responsible for the first dog selectively activating one or more of the spray activator and the sound activator in response to a perceived threat to the first dog by the second dog.

7. The method of claim 6, wherein the method further comprises the transmitting unit causing the receiver to emit at least one of a sound having a frequency of about 20,000 Hz to about 45,000 Hz or the substance.

8. The method of claim 6, wherein the disposing a receiving unit on the first dog comprises attaching the receiving unit to an animal collar of the first dog.

9. The method of claim 8, wherein the spray mechanism spraying a predetermined amount of the substance only radially outwardly in a plurality of directions comprises spraying the substance in a direction perpendicular to the animal collar.

10. The method of claim 6, wherein the liquid reservoir comprises a compressed fluid canister.

11. The method of claim 6, wherein the spray mechanism comprises an electronically activated valve, and a length of tubing having a plurality of nozzles.

12. The method of claim 11, wherein the plurality of nozzles are directed to project the substance only radially outwardly.

13. The method of claim 6, wherein the step of providing the transmitting unit comprises providing the transmitting unit integral to an animal leash.

14. The method of claim 6, wherein the step of providing the transmitting unit comprises providing the transmitting unit disposed on a key chain.

15. The method of claim 14, wherein the step of providing the transmitting unit comprises providing the transmitting unit including a protective cover disposed over at least one of the spray activator and the sound activator.

16. The method of claim 6, wherein the step of disposing a receiving unit on the first dog comprises disposing the receiving unit integral to an animal collar of the first dog.

\* \* \* \* \*